United States Patent [19]
Smith et al.

[11] Patent Number: 5,588,141
[45] Date of Patent: Dec. 24, 1996

[54] SYSTEM FOR EXECUTING DIFFERENT FUNCTIONS ASSOCIATED WITH DIFFERENT CONTEXTS CORRESPONDING TO DIFFERENT SCREEN EVENTS BASED UPON INFORMATION STORED IN UNIFIED DATA STRUCTURE

[75] Inventors: Walter R. Smith, Palo Alto; Stephen P. Capps, San Carlos, both of Calif.

[73] Assignee: Apple Computer, Inc., Cupertino, Calif.

[21] Appl. No.: 99,852

[22] Filed: Jul. 30, 1993

[51] Int. Cl.$^6$ ..................................................... G06F 9/06
[52] U.S. Cl. ........................... 395/500; 395/701; 395/326
[58] Field of Search ................................... 395/650, 700, 395/155; 364/300

[56] References Cited

U.S. PATENT DOCUMENTS

| | | | |
|---|---|---|---|
| 4,864,497 | 9/1989 | Lowry et al. | 364/300 |
| 5,107,490 | 4/1992 | Davidson et al. | 395/650 |
| 5,265,206 | 11/1993 | Shackelford et al. | 395/200 |
| 5,303,367 | 4/1994 | Leenstra, Sr. et al. | 395/600 |
| 5,327,529 | 7/1994 | Fults et al. | 395/155 |
| 5,327,562 | 7/1994 | Adcock | 395/700 |
| 5,404,528 | 4/1995 | Mahajan | 395/650 |
| 5,410,705 | 4/1995 | Jones et al. | 395/700 |
| 5,418,942 | 5/1995 | Krawchuk et al. | 395/600 |
| 5,428,792 | 6/1995 | Conner et al. | 395/700 |
| 5,442,793 | 8/1995 | Christian et al. | 395/700 |

FOREIGN PATENT DOCUMENTS

| | | |
|---|---|---|
| 90/04827 | 5/1990 | WIPO . |

OTHER PUBLICATIONS

O'Connor, Rory J., "Apple Banking on Newton's Brain", Apr. 22, 1992, San Jose Mercury News.
Weiman, Liza and Moran, Tom, "A Step Toward the Future", Aug. 1992, Macworld Magazine.
Soviero, Marcelle M., "Your World According to Newton", Sep. 1992, Popular Science Magazine.
Abatemarco, Fred, "From the Editor", Sep. 1992, Popular Science Magazine.

*Primary Examiner*—Thomas C. Lee
*Assistant Examiner*—Duo Chen
*Attorney, Agent, or Firm*—Hickman Beyer & Weaver

[57] ABSTRACT

A method and apparatus for providing a unified data approach to performing computational services, particularly in pen-based computer systems. The approach employs object oriented functions and establishes common data structures employable in the standardized form in particular defined functional domains of the computer system. The functional domains in which the common data structures are employable without adaptation include the view system, the scripting system, and the object store functional domains of the computational system, which preferably is a pen-based computer system. The apparatus according to the invention further includes an object system for creating, eliminating and managing the predetermined data objects and structures. The object store functional domain provides external storage with respect to the externally located operating system with which it cooperates through a minimal, i.e., narrow interface. The view system and the scripting system effectively operate in cooperation with each other in a integrated fashion enabled by similar context, unified data structures according to the invention herein.

27 Claims, 16 Drawing Sheets

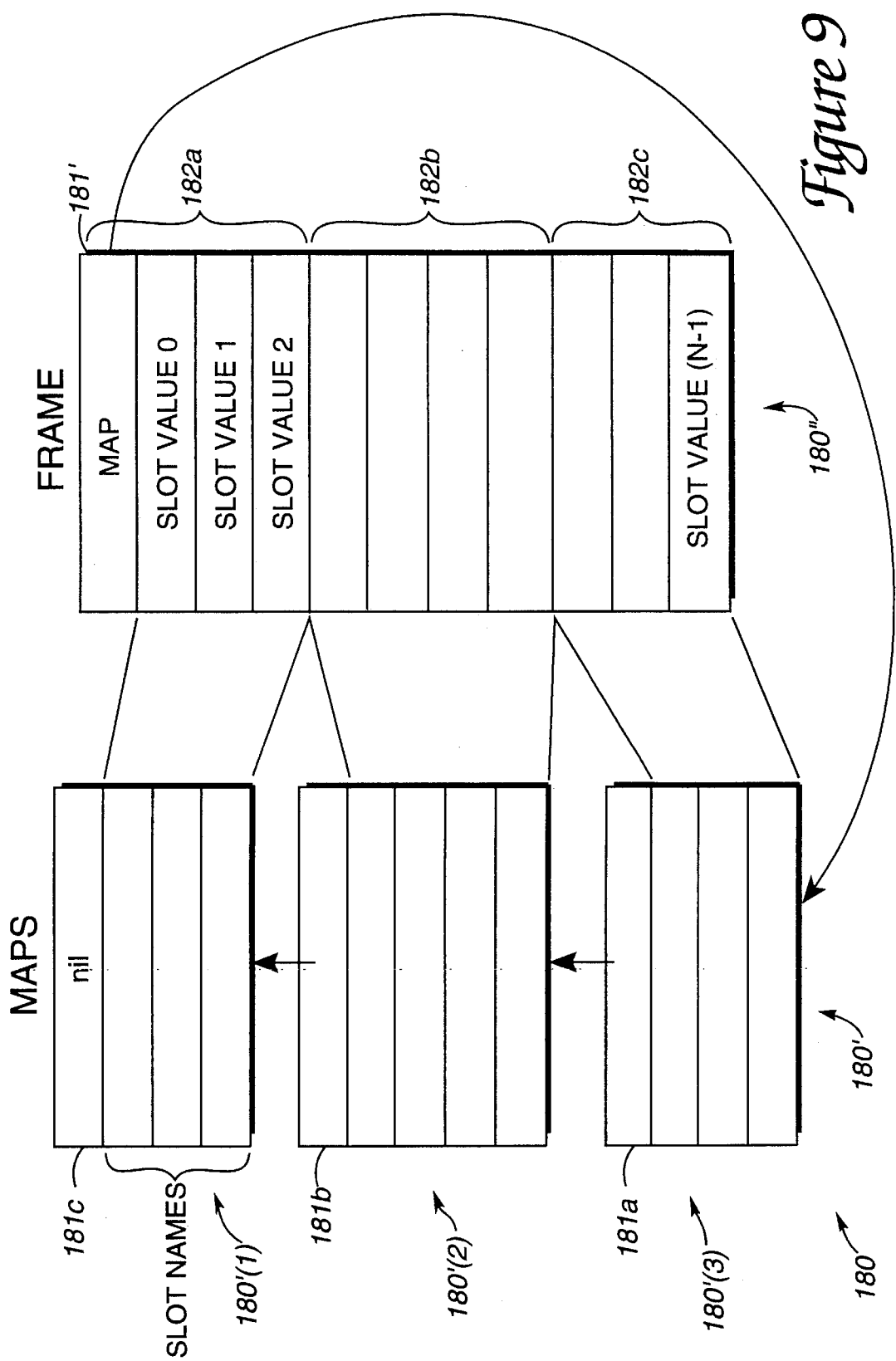

SYSTEM FOR EXECUTING DIFFERENT FUNCTIONS ASSOCIATED WITH DIFFERENT CONTEXTS CORRESPONDING TO DIFFERENT SCREEN EVENTS BASED UPON INFORMATION STORED IN UNIFIED DATA STRUCTURE

BACKGROUND OF THE INVENTION

The present invention relates generally to computer systems, and more particularly to computer-implemented assistance methods and apparatus.

Computerized personal organizers are becoming increasingly popular with a large segment of the population. Computerized personal organizers tend to be small, lightweight, and relatively inexpensive, and can perform such functions as keeping a calendar, an address book, a to-do list, etc. While many of these functions can also be provided in conventional computer systems, personal organizers are very well suited to the personal organization task due to their small size and portability. Personal organizers are available from such companies as Sharp and Casio of Japan.

A relatively new form of computer, the pen-based computer system, holds forth the promise of a marriage of the power of a general purpose computer with the functionality and small size of a personal organizer. A pen-based computer system is typically a small, hand-held computer where the primary method for inputting data includes a "pen" or stylus. A pen-based computer system is commonly housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion.

One approach to implementing a pen-based system is to employ traditional data structures which are optimized for the particular local functions in which the data structures are currently employed. This however carries with it a range of inefficiencies, in that the data structures must continually be restructured according to the particular context in which they find themselves.

Further, the implementation of a pen-based systems may be accomplished with a multiplicity of different data structure kinds which are not fully integrated, and which require complex interfacing and conversion services in order effectively to co-function. This is undesirable because of the additional computational and memory overhead it demands.

SUMMARY OF THE INVENTION

According to the invention, a method and apparatus has been developed for providing a unified data approach to performing computational services, particularly in pen-based computer systems. This approach employs object oriented functions and establishes common data structures employable in the standardized form in particular defined functional domains of the computer system. The functional domains in which the common data structures are employable without adaptation include the view system, the scripting system, and the object store functional domains of the computational system, which preferably is a pen-based computer system. The apparatus according to the invention further includes an object system for creating, eliminating and managing the predetermined data objects and structures. The object store functional domain provides external storage with respect to the externally located operating system with which it cooperates through a minimal, i.e., narrow interface. The view system and the scripting system effectively operate in cooperation with each other in a integrated fashion enabled by the unified data structure according to the invention herein.

More particularly, the invention is directed toward accomplishing unified data structure operations in connection with a computer interface system effective for external communication of physical information elements. The process of the invention includes activating a selected screen on a computer display by effecting a screen event with predetermined context, sending a message with respect to the indicated screen event to a first unified data structure element which is dedicated to the computer interface system, responding to the message according to the context of the screen event, including execution of at least a single function object represented in the context of the message, and referring to at least a second unified data structure element pointed to by the first unified data structure element in the context of the message. The invention is further directed toward a computer system employing a unified data structure system. The computer system includes a computation system for performing information handling functions. It includes a memory system for managing a unified data structure system, said memory means being coupled to said computation means, an interface for external communication of information, a system for accomplishing unified data structure operations with the interface means, a way of activating a selected screen on a computer display, which is effective for accomplishing a screen event with predetermined context, and a way for sending a message with respect to the indicated screen event to a first unified data structure element which is dedicated to the computer interface system and which points to a second unified data structure element, and a system for responding to the message according to the context of the screen event. The system for responding to the message is effective for execution of at least a single function object represented in the context of the message. The computer system further includes a mechanism for referring to at least a second unified data structure element pointed to by the first unified data structure element in the context of the message.

These and other advantages of the present invention will become apparent upon reading the following detailed descriptions and studying the various figures of the drawings.

BRIEF DESCRIPTION OF THE DRAWINGS

FIG. 9 shows an example of a typical frame object, broken into a more useful collection of data objects more effectively utilized and more efficiently stored.

FIG. 11b illustrates details of a semantic version of the implementation of the data structures set forth in FIG. 11a.

DETAILED DESCRIPTION OF THE PREFERRED EMBODIMENTS

The present invention is well suited for pointer based computer systems such as the pen-based, pen-aware and mouse controlled systems that are currently popular. For the purposes of illustration, the invention will be described in connection with a pen-based system.

Figure 1:
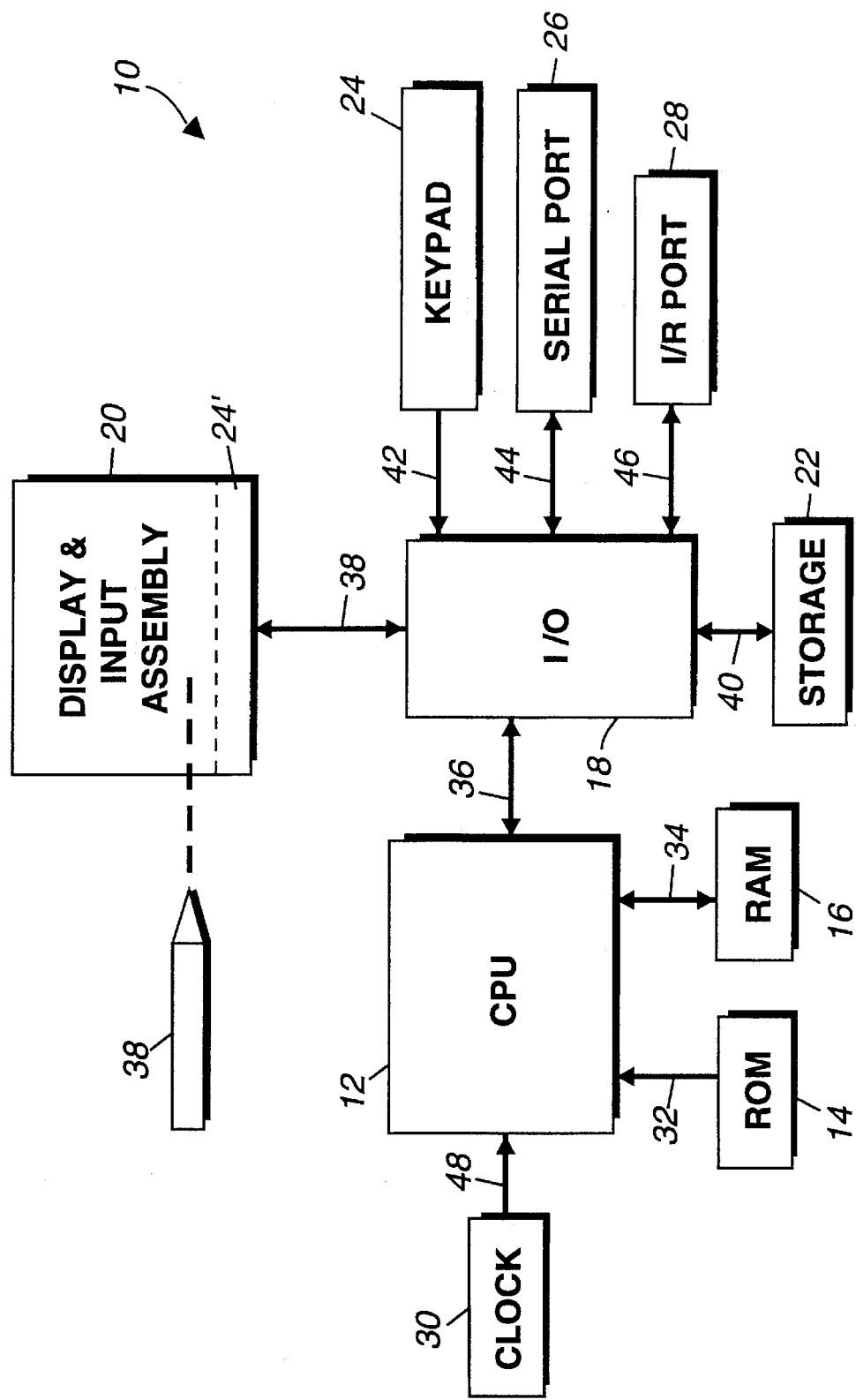
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22, a keypad (or keyboard) 24, a serial port 26, an infrared (I/R) port 28, and a clock 30.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 32. ROM 14 contains the basic operating system for the pen-based computer system 10. CPU 12 is connected to RAM 16 by a bi-directional data bus 34 to permit the use of RAM 16 as scratch pad memory. ROM 14 and RAM 16 are also coupled to CPU 12 by appropriate control and address busses, as is well known to those skilled in the art. CPU 12 is also coupled to the I/O circuitry 18 by bi-directional data bus 36 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, keypad 24, serial port 26, and FR port 28.

Display assembly 20 of pen-based computer system 10 is both an input and an output device. Accordingly, it is coupled to I/O from a variety of vendors. The input device of display assembly 20 is preferably a thin, clear membrane which covers the LCD display and which is sensitive to the position of a stylus 38 on its surface. With such a structure, the display assembly 20 can serve as an input "tablet." These position sensitive membranes are also readily available on the commercial market. Alternatively, other types of tablets can be used, such as inductively coupled tablets. Combination display assemblies such as display assembly 20 which include both the LCD and the input membrane are commercially available from such vendors as Scriptel Corporation of Columbus, Ohio.

Some type of mass storage 22 is generally considered desirable. Mass storage 22 can be coupled to I/O circuitry 18 by a bi-directional data bus 40. However, the mass storage 22 can be eliminated by providing a sufficient amount of RAM 16 to store user application programs and data. In that case, the RAM 16 can be provided with a backup battery to prevent the loss of data even when the pen-based computer system 10 is turned off. However, it is generally desirable to have some type of long term mass storage 22 such as a commercially available miniature hard disk drive, nonvolatile memory such as flash memory, battery backed RAM, a PCMCIA card, or the like.

Figure 2:
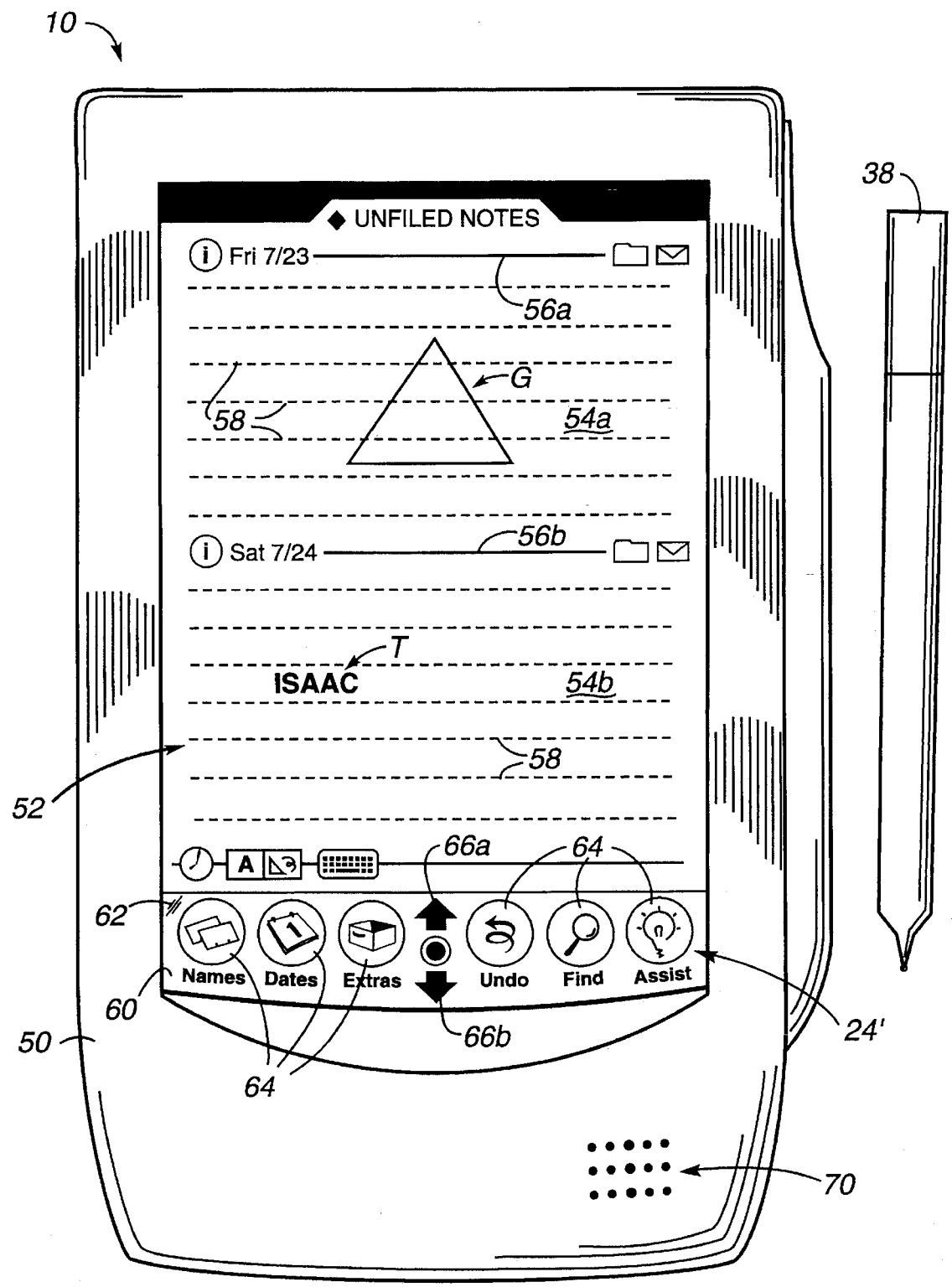
FIG. 2 is a top plan view of the screen, case, and keypad of the computer System of FIG. 1.

The keypad 24 can comprise an array of mechanical buttons or switches coupled to I/O circuitry 18 by a data bus 42. Alternatively, keypad 24 can comprise an entire, standard QWERTY keyboard. In the present embodiment, a separate keypad 24 is not used in favor of a "pseudo" keypad 24'. This "pseudo" keypad 24' comprises "button" areas which are associated with a bottom edge of the tablet membrane that extends beyond the lower edge of the LCD display. These button areas are defined by a printed or silk-screened icons which can be seen through the transparent membrane of the input tablet. When the "buttons" are selected by engaging the stylus 38 with the membrane over these printed icons, the membrane senses the pressure and communicates that fact to the CPU 12 via data bus 38 and I/O 18. An example of pseudo keypad 24' is shown in FIG. 2.

Other types of pointing devices can also be used in conjunction with the present invention, for example, an interrupt port of the CPU 12 which can count the clock pulses to provide the time function. However, this alternative clock embodiment tends to be wasteful of CPU processing power. Clock 30 is coupled to CPU 12 by a data bus 48.

In operation, information is input into the pen-based computer system 10 by "writing" on the screen of display assembly 20 with the stylus 38. Information concerning the location of the stylus 38 on the screen of the display assembly 20 is input into the CPU 12 via data bus 38 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Serial port 26 is coupled to I/O circuitry by a bi-directional bus 44. The serial port 26 can be used to couple the CPU to external devices and networks.

Infrared (I/R) port 28 is coupled to I/O circuitry by a bi-directional bus 46. The I/R port can be used for outgoing information (e.g. to control a printer or some other external device, or to communicate with other computer systems) or for incoming information from other computers or devices.

Clock 30 preferably comprises a real-time clock to provide real-time information to the system 10. Alternatively, clock 30 can simply provide regular clock pulses to possibly an application program stored in ROM 14, RAM 16, or mass storage 22. The CPU 12 next produces data which is transferred to the display assembly 20 via I/O circuitry 18 and data bus 38 to produce appropriate images on the screen portion of the display assembly 20.

In FIG. 2, the pen-based computer system 10 of FIG. 1 is shown housed within a generally rectangular enclosure 50. The CPU 12, ROM 14, RAM 16, I/O circuitry 18, and clock 26 are preferably fully enclosed within the enclosure 50. The display assembly 20 (FIG. 1) is mostly enclosed within the enclosure 50, but a viewing screen 52 of the display assembly is exposed to the user. As used herein, the term "screen" will refer to the portion of the display assembly 20 which can display an image that can be viewed by a user. Also accessible to the user is the pseudo keypad 24' that was described with reference to FIG. 1.

Upon power-up, pen based computer system 10 displays on screen 52 an initial "note" area 54a including a header bar 56a and a number of guidelines 58. The header bar 56a preferably includes the date of creation of the note area 54a and a number of icons and "soft" buttons, not particularly germane to the discussion of the present invention. For this reason, the header bar 56a will not be discussed in detail herein. The optional guidelines 58 aid a user in entering text, graphics, and data into the pen-based computer system 10. A graphic object G in the form of a triangle is shown entered within note area 54a.

Additional note areas, such as a note area 54b, can be formed by the user by drawing a substantially horizontal line across the screen 52 with the stylus 38. The substantially horizontal line is recognized by the system 10 and is converted into a second header bar 56b. Additional text, graphical, and other data can then be entered into this second note area 54b. For example, the text object T comprising "ISAAC" has been entered into second note area 54b.

In this preferred embodiment, the keypad 24', as explained previously, comprises a printed or silk-screened member 60 provided beneath a lower edge of a thin, clear, stylus-sensitive membrane 62 of the input "tablet." Alternatively, a keypad could comprise a mechanical keypad (or keyboard) 24, or a keypad could comprise "soft buttons" i.e. images generated at convenient locations on the screen 52, in which case a "button" would be activated by touching the stylus to the screen over the image of the button. The keypad 24' preferably includes a number of dedicated function buttons 64 and a pair of scroll buttons 66a and 66b. The operation of the note areas 54a, 54b, etc., scroll buttons 66a and 66b, and other aspects of computer system 10 are discussed in greater detail in co-pending U.S. patent application Ser. No. 07/868,013, filed Apr. 13, 1992 on behalf of Tchao et al., assigned to the assignee of the present invention and incorporated herein by reference in its entirety.

The screen illustrated in FIG. 2 is referred to as the "notepad", and is preferably an application program running under the operating system of the pen based computer system 10. In this preferred embodiment, the notepad is a special or "base" application which is always available beneath higher level applications. The notepad application, like other applications, runs within a window, which in this instance comprises the entire viewing screen 52. Therefore, as used herein, a "window" is the entire screen or any portion of an entire screen which is dedicated to a particular application program.

A status bar 68 is provided at the bottom of the notepad application. The status bar 68 is provided with a number of active and display areas, which again are not particularly germane to the present invention and will therefore not be discussed in detail herein. U.S. patent application Ser. No. 07/976,970 filed Nov. 16, 1992 on behalf of Foster et. al, entitled "Status Bar for Application Windows" and assigned to the assignee of the present invention describes how to make and use the status bar, and is incorporated herein by reference in its entirety.

The enclosure 50 is preferably provided with apertures 70 which permit the free transmission of sound from a speaker (not shown) which is housed within enclosure 50. The speaker can be driven by the CPU 12, by I/O circuitry 18, or by specialized sound chips, as is well known to those skilled in the art. The speaker can be used to provide user feedback, or to transmit audible information to a user.

The term "object" will be used extensively in the following discussions. As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include paragraph, line, and word objects. There are many well known texts which describe object oriented programming. See, for example, *Object Oriented Programming for the Macintosh,* by Kurt J. Schmucher, Hayden Book Company, 1986.

In the present invention, objects are preferably implemented as part of a frame system that comprises frame objects related by a semantic network. A description of semantic networks can be found in "A Fundamental Tradeoff in Knowledge Representation and Reasoning", *Readings in Knowledge Representation,* by Brachman and Leveseque, Morgan Kaufman, San Mateo, 1985.

It will be noted there is a liberal use of graphic elements in the present invention. For example, the header bars 56a and 56b include lines and other graphical elements. Processes for drawing lines on a computer screen are well known to those skilled in the art. For example, graphics software such as QUICKDRAW from Apple Computer, Inc. of Cupertino, Calif. can be used to draw lines, simple geometrical shapes, etc. A description of the QUICKDRAW graphics software is found in the book *Inside Macintosh,* Volumes I, II, and III, by C. Rose et al., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 52 forms a first or "root" layer, with the status bar 68, for example, positioned in a second layer "over" the root layer. The various buttons of the status bar 68 are positioned in a third layer "over" the second and root layers. The view system automatically handles "taps" and other gestures of the stylus 38 on the screen 52 by returning information concerning the tap or gesture and any object to which it may be related. Again, the status bar 68 and the view system is described in greater detail in co-pending U.S. patent application Ser. No. 07/976,970, which has been incorporated herein by reference. It is therefore clear that the object oriented programming and view system software makes the implementation of the processes of the present invention less cumbersome than traditional programming techniques. However, the processes of the present invention can also be implemented in alternative fashions, as will be well appreciated by those skilled in the art.

Figure 3:
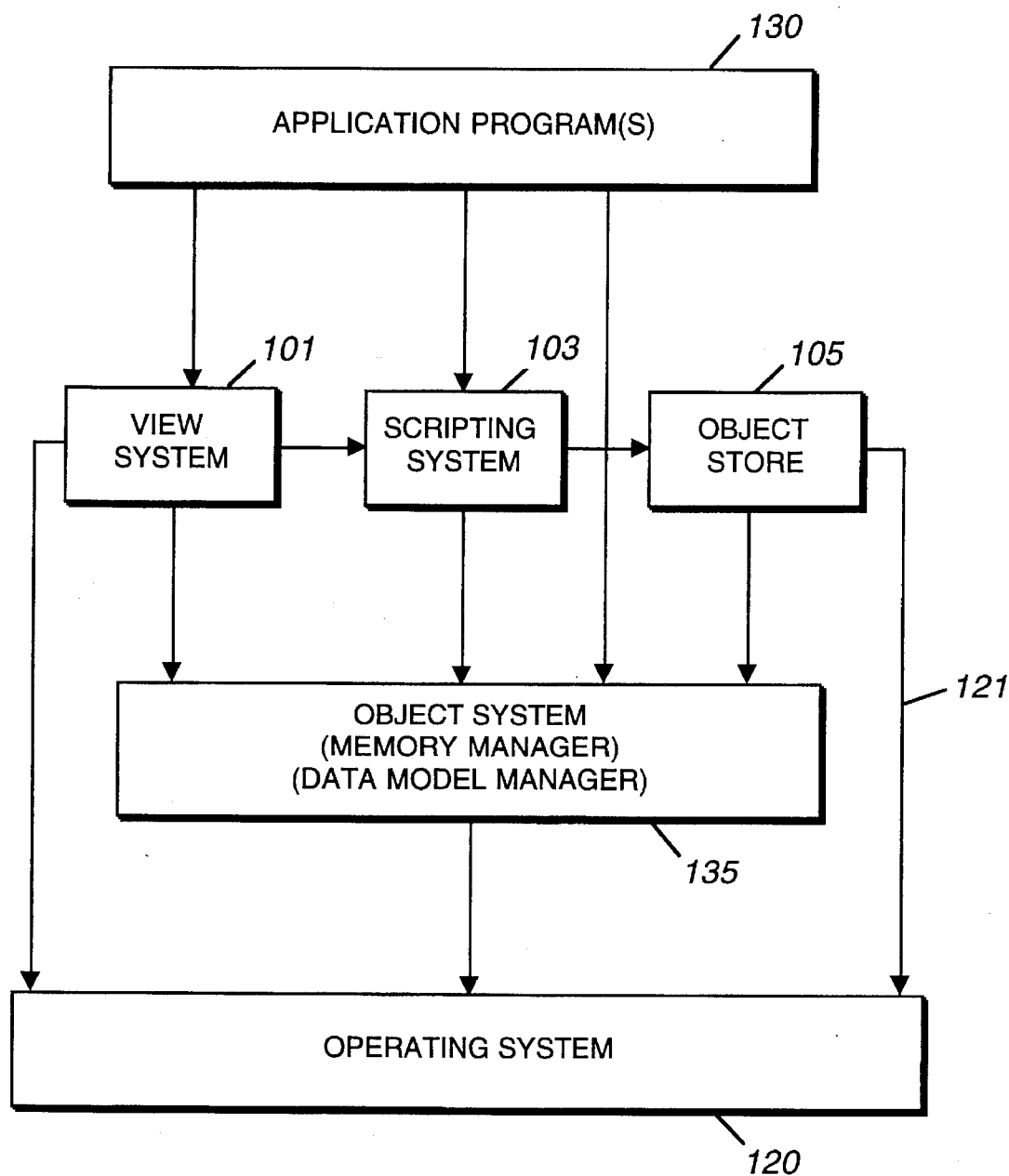
FIG. 3 illustrates in block diagram form, the overall functional scheme portion of the computer system of FIG. 1 which deals with the unified data structures according to the invention herein.

FIG. 3 shows a method and apparatus that has been developed for providing a unified data approach to performing computational services, particularly in pen-based computer systems. This approach employs object oriented functions and establishes common data structures employable in the standardized form in particular defined functional domains of the computer system. The functional domains in which the common data structures are employable without adaptation include a view system 101, a scripting system 103 functionally interactive with the view system 101, and the object store functional domain 105 (simply referred to herein as the object store 105) of the computational system, which preferably is a pen-based computer system. The apparatus according to the invention further includes an object system 110 for creating, eliminating and managing predetermined data objects and structures which will be discussed below. The object system 110 is based upon well-known features for example described in D. Knuth's book, The Art of Computer Programming. The object store functional domain provides external storage with respect to an externally located operating system 120 with which it cooperates through a minimal, i.e., narrow interface 121. The scripting system 103 is detailed comprehensively in a related patent application filed on the same day as this application, entitled "Method and Apparatus for Implementing I/O in a Frame-Based Computer System," to inventor Walter R. Smith, as U.S. patent application Ser. No. 08/099, 860, filed on Jul. 30, 1993. This patent application is hereby expressly referred to and incorporated herein.

The view system 101 and the scripting system 103 effectively operate in cooperation with each other in a integrated fashion enabled by similar context, unified data structures according to the invention herein. The operation of the view system 101, the scripting system 103, and the object store are each subject to particularized direction by application program(s) 130 directed toward a range of functions not detailed here and not considered within the scope of the invention herein. The view system 101, the scripting system 103, the application programs 130, and the object store 105 are each interactive with an object system 135, which in turn interfaces with the operating system, as will be discussed below. The object system 135 is effective for conducting a range of activities including conducting memory management and data structure management as detailed below. The view system 101 and the object store 105 have direct interaction with the operating system according to conventional arrangements which are not considered to be part of the invention herein.

Figure 4A:
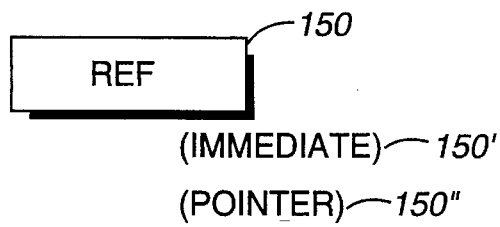
FIGS. 4a–4f show respectively a general representation of a slot reference or "ref" contained in the various data objects to be discussed in connection with FIGS. 5a, 5b, 6a, 6b, 7a, and 7b.
Figure 4B:
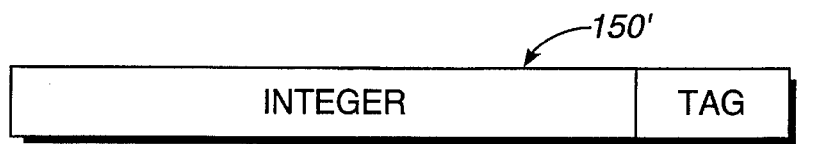
Figure 4C:
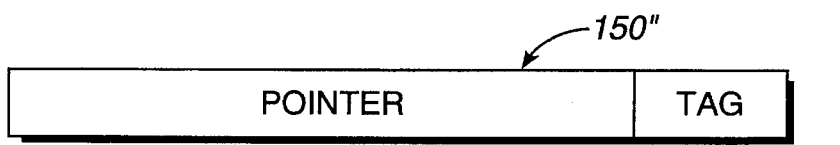
Figure 4D:
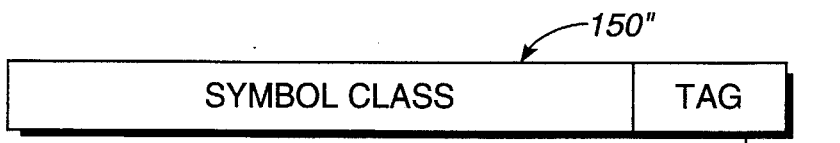
Figure 4E:
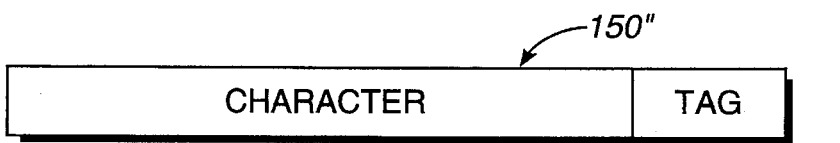
Figure 4F:
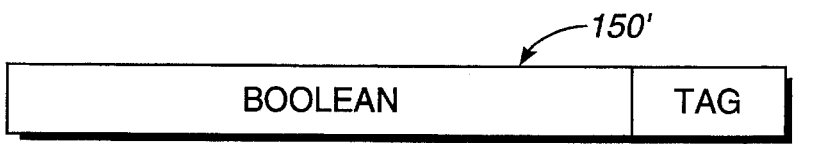

FIG. 4a illustrates an element of the unified data structure of the invention, namely the "ref" or reference 150. Refs 150 come in many types, but are typically classified in two categories, the immediate ref 150' and the pointer ref 150". For simplicity, these will simply be referred to as immediates 150' and pointers 150". Refs 150 are simply values or elements found in slots of primitives such as binary objects, arrays, or frames, as will be noted in greater detail below. FIGS. 4b–4f show additional examples of common refs 150. Each ref 150 includes a portion thereof which is allocated to a tag function 151 or tag 151 which is effective for defining the kind and perhaps subkind of ref carried in the particular object slot, as will be discussed below. By way of particular detail at this point, it is noted that FIGS. 4b–4f respectively indicate the following kinds of refs 150: the integer ref 150, which is an example of an immediate ref 150", shown in FIG. 4b; the pointer ref 150", at FIG. 4c; the symbol class ref 150, which is a particular example of a immediate ref 150', shown at FIG. 4d; the character ref 150, another particular example of a immediate ref 150', shown at FIG. 4e; and the Boolean ref 150, another example of a immediate ref 150', shown at FIG. 4f.

Figure 5A:
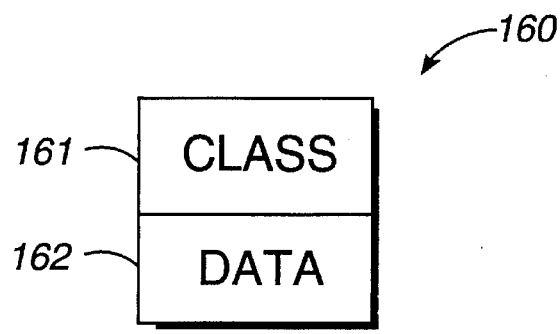
FIGS. 5a–5b respectively show simplified and expanded representations of a binary data object.

Another basic element of the unified data structure according to the invention, and as shown in FIG. 5a, is the binary object 160, which contains two regions 161 and 162, the respective regions being effective for holding a name and a quantum of bits. The binary object 160, is one of a number of primitives, further including arrays and frames, as will be discussed below, which are key aspects of the unified data structure. These basic data structures, the binary object, the array, and the frame, are frequently referred to as primitives. In the particular case of the binary object 160 shown in FIG. 5a, the first region 161 contains the ref CLASS. The second region 162 contains data.

Figure 5B:
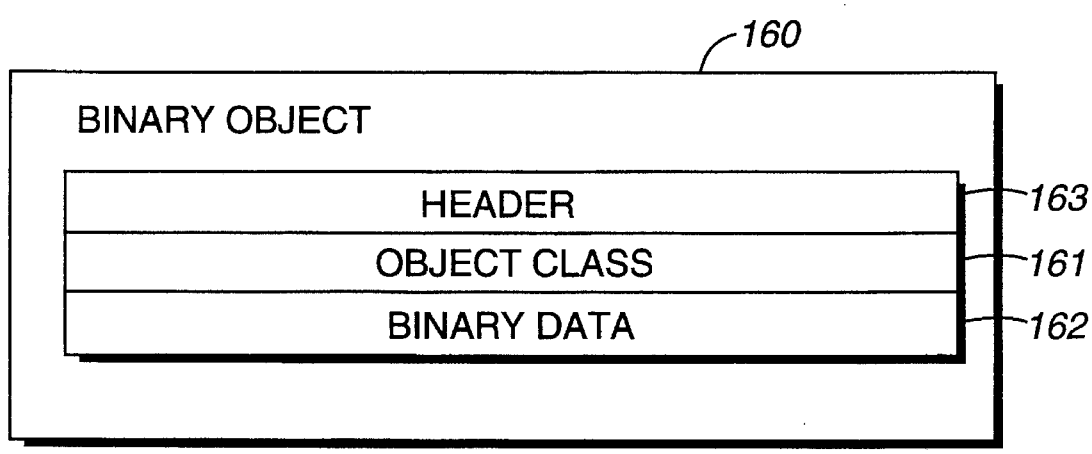

FIG. 5b shows additional information of the structure of the kind of primitive shown in FIG. 5a. In particular, binary object 160 additionally includes a header slot 163. The information in the first and second slots is particularly considered respectively to be object class information and binary data. The header information is useful information which is employed in the handling and management of objects by the object system 135 referred to above, and as will be discussed in greater detail below.

Figure 6A:
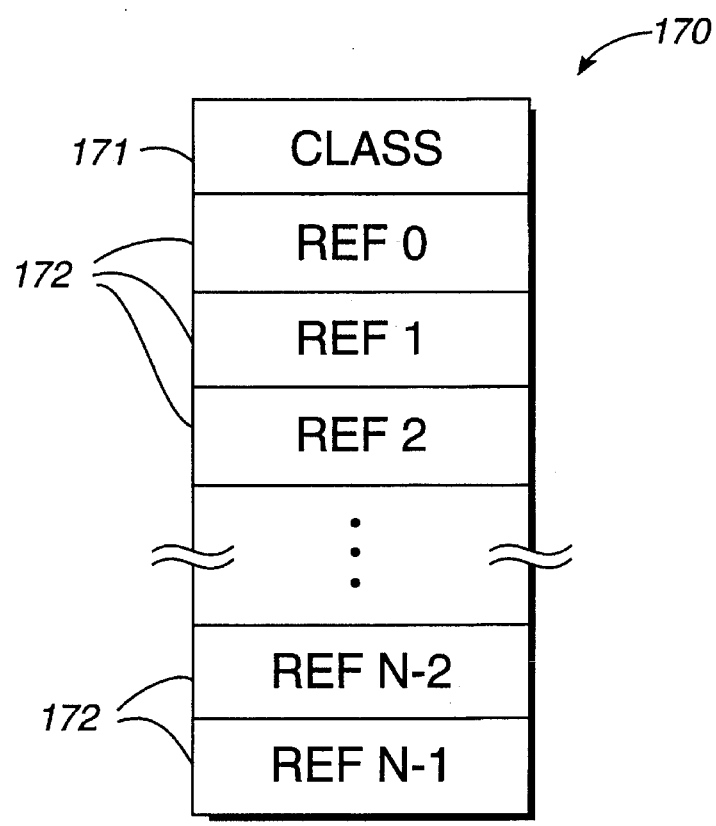
FIGS. 6a–6b respectively show simplified and expanded representations of an array data object.
Figure 6B:
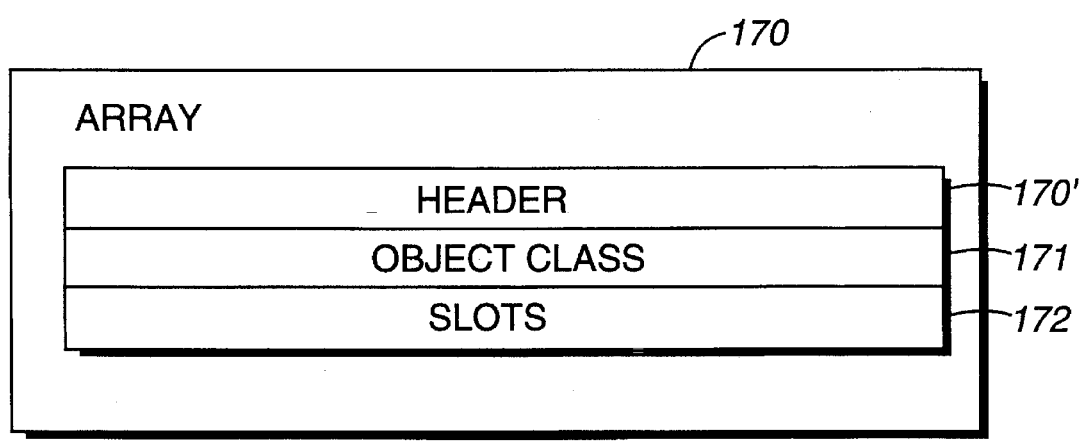

FIGS. 6a–6b respectively show simplified and expanded representations of an array data object 170. In particular, FIG. 6a shows the semantic version of the array data object 170, including CLASS ref 171 and a finite series of slots 172, in this case numbering from zero to a selected number N minus 1. The actual array data object 170 is shown at FIG. 6b, including CLASS ref 171, slots 172, and a header 170'.

Figure 7A:
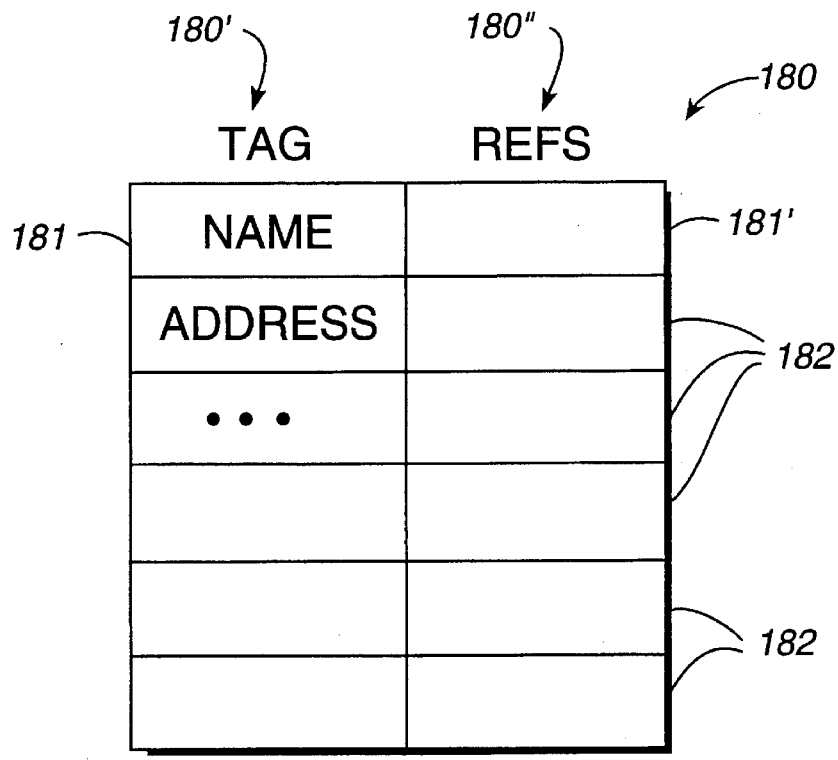
FIGS. 7a–7b respectively show simplified and expanded representations of a frame data object.
Figure 7B:
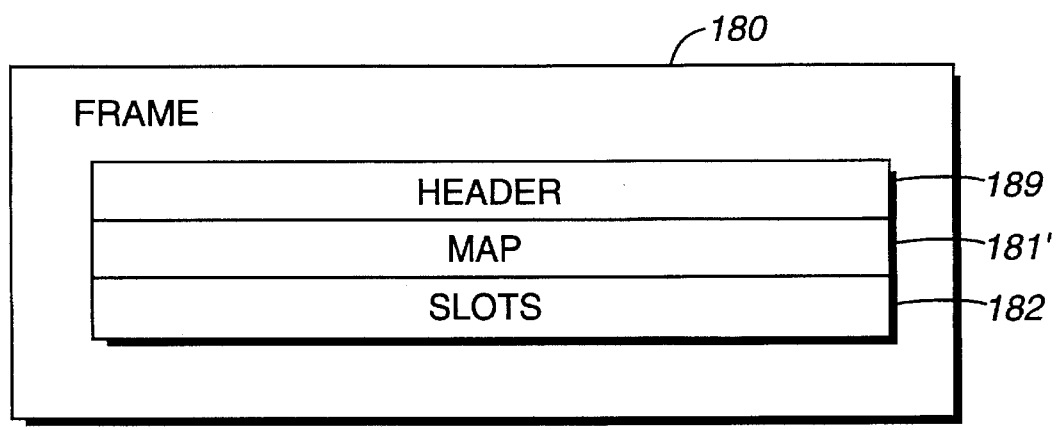

FIGS. 7a–7b respectively show simplified and expanded representations of a frame data object 180, including first and second columns, respectively a tag column 180' and a refs column 180". The tag column 180' contains a series of tags for corresponding immediates and/or pointers in refs column 180".

Figure 8:
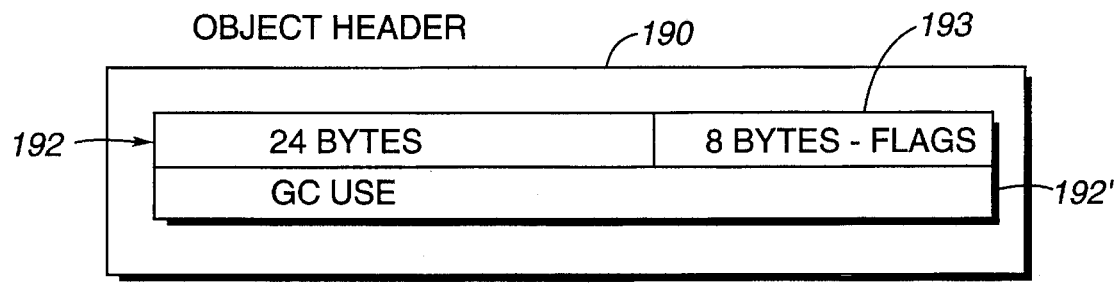
FIG. 8 shows the general form of an object header.

FIG. 8 shows the general form of an object header 190. The object header may contain a set of information elements 192, including a flag region 193 and a region for so-called "garbage collector (GC)" use. This set of information elements 193 can be used for a variety of purposes such as for example for not GCing, for marking, and for compacting. These respective functions of an object header permit the memory manager portion of the object system 135 in FIG. 3 to conduct particular memory management functions which are not considered to be part of this invention.

FIG. 9 shows an example of a typical frame object 180 broken into a more useful collection of data objects more effectively utilized and more efficiently stored. In particular, the frame object 180 is broken into respective tag and ref portions, respectively 180' and 180". The top element of the ref portion 180" is a pointer to a reduced array 180'(3) comprising the tag elements of the last three slots in the frame object 180. The tag portion 180' is additionally broken in to two further array sections, 180'(1) and 180'(2). At the top of each of these respective array portions 180'(1) through 180'(2) is an additional pointer slot, respectively 181a, 181b, or 181c, indicating its parent, if any. It is notable that 181b is the supermap of 181a. Further, 181c is the supermap of 181b. Finally, 181c has no supermaps.

Figure 9A:
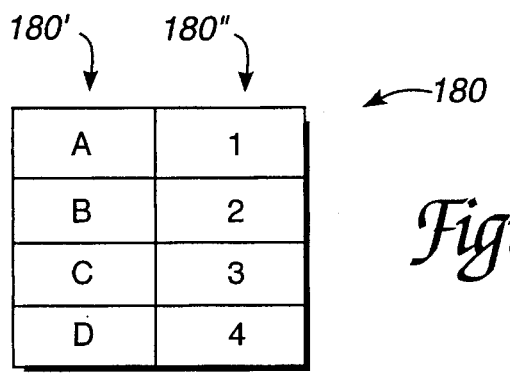
FIG. 9a shows the semantic version of the frame shown in FIG. 9.
Figure 9B:
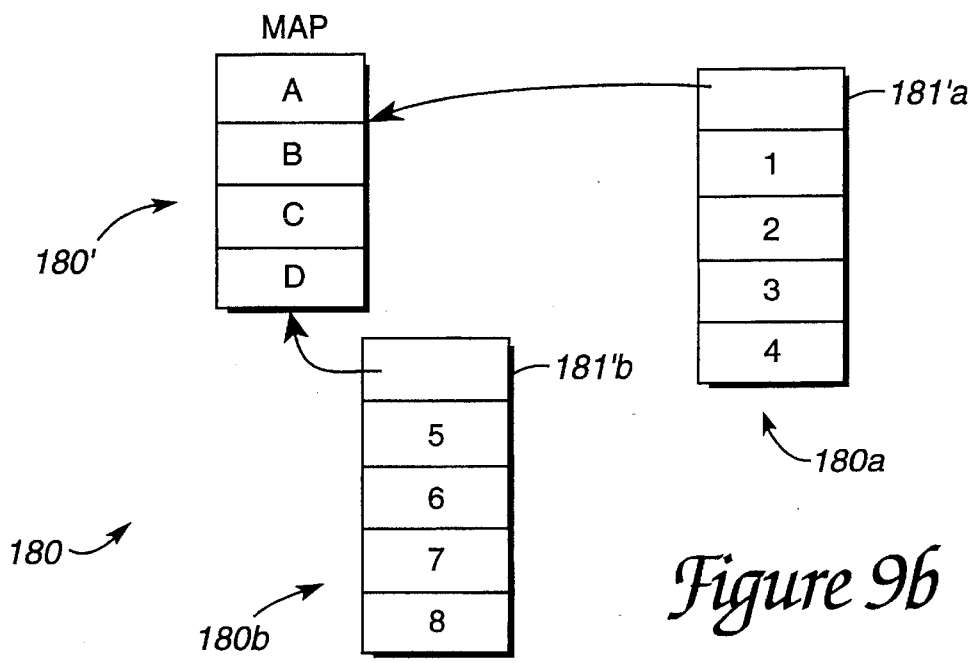
FIG. 9b shows one version of an approach to breaking up the frame into more useful object components, while maintaining the relationships between the slots in effective defined contextual connection.
Figure 9C:
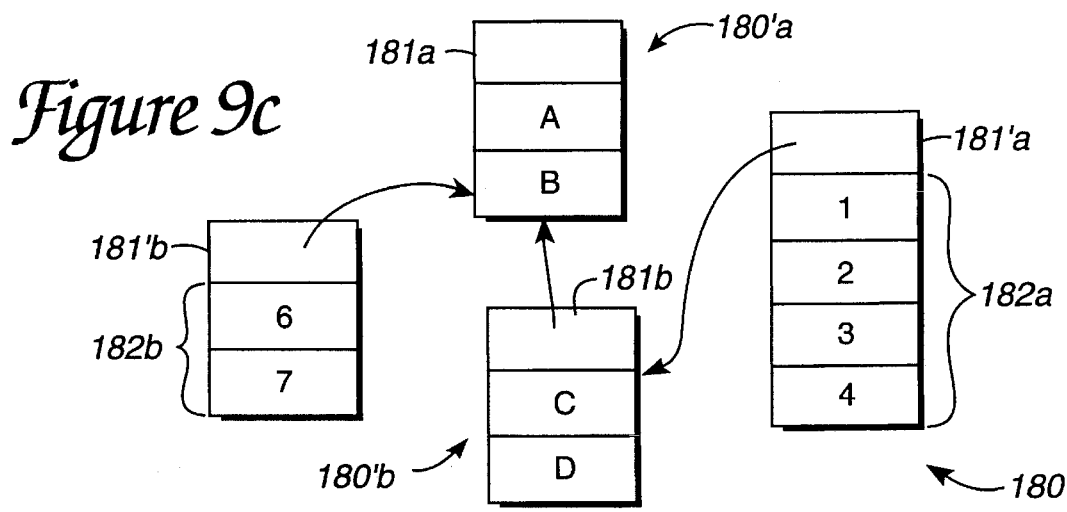
FIG. 9c shows yet another approach to breaking up the frame while maintaining its functionality.

FIG. 9a shows the semantic version of the frame 180 shown in FIG. 9. FIG. 9b illustrates schematically, how the break-up of this frame 180 can be accomplished, and what the advantage of doing so can be. This is clear by considering that several ref portions 181'a and 181'b can refer to a single tag portion 180', by virtue of respective pointers 181'a and 181'b. Thus, FIG. 9b shows one version of an approach to breaking up the frame into more useful object components, while maintaining the relationships between the slots in effective defined contextual connection. FIG. 9c shows yet another approach to breaking up the frame 180 while maintaining its functionality. Shown are two flames. The first frame is {A:6, B:7}. The tags for this first frame are in structure 180a. The refs for this first frame are in 181'b. The second frame is {A:1, B:2, C:3, D:4}. The tags for this second frame are in structures 180'a and 180'b. The refs for the second frame are in structure 181'a. As can be seen, by allowing for shared structures, certain economies are achieved. This fragmentation of the frame 180 further permits great flexibility in the handling and storage of the frame object 180, while maintaining all desired interrelationships between refs and tags within frame 180.

Figure 10A:
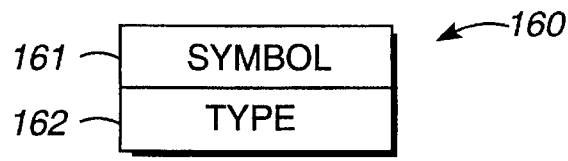
FIG. 10a shows symbol type binary object example.
Figure 10B:
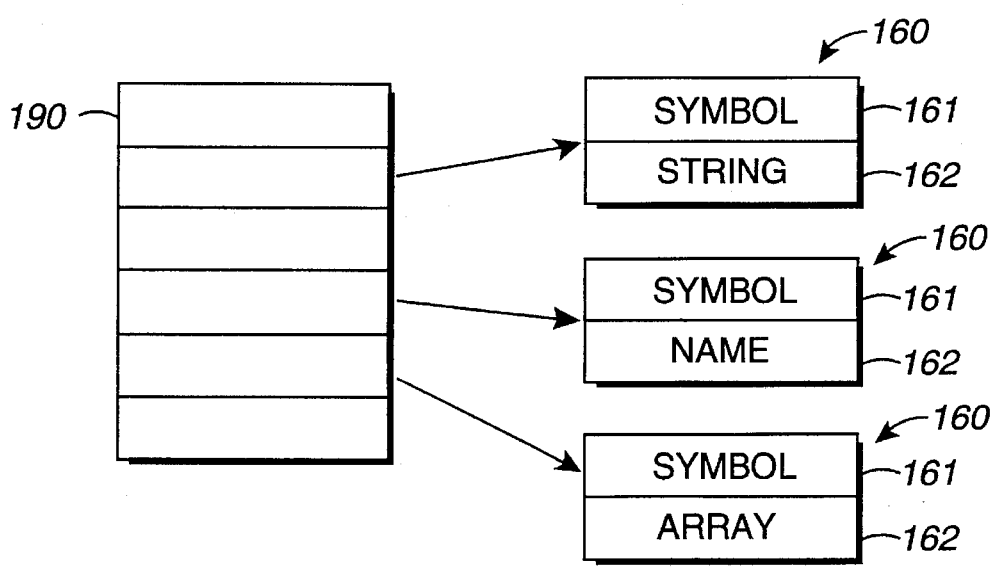
FIG. 10b shows a symbol table for organizing and referring to each of the associated symbol objects contained in the table.
Figure 10C:
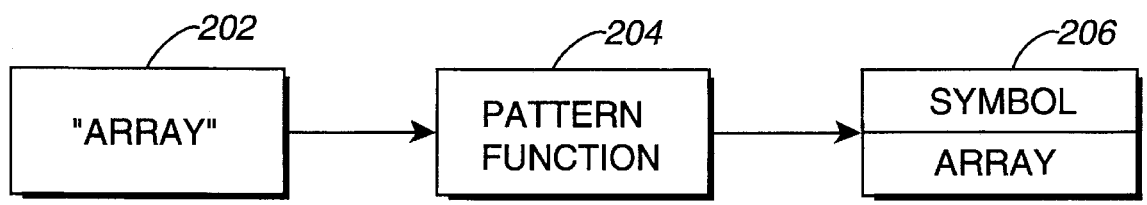
FIG. 10c shows the process for establishing a symbol ref object from its representation in an array data structure.

FIG. 10a shows a symbol type binary object 160, including first and second regions, 161 and 162. Region 161 contains the the class name of binary object 160. In this case, the class is "SYMBOL" class. Region 162 contains data, in this case the name, "TYPE." FIG. 10b shows a symbol table 190 for organizing and referring to each of the associated symbol objects contained in the table. The symbols present in the table point to symbol objects 160 to the right of the table 190, indicating the many symbol objects, such as "STRING," "NAME," and "ARRAY." FIG. 10c shows the process for establishing a ref of a symbol object from its representation in an array data structure. If, for example, the array symbol had been absent from table 190, its naming at 202 as an array would permit a specialized pattern function 204 to generate the array symbol 206 in connection with table 190 as shown in FIG. 10b.

Figure 10D:
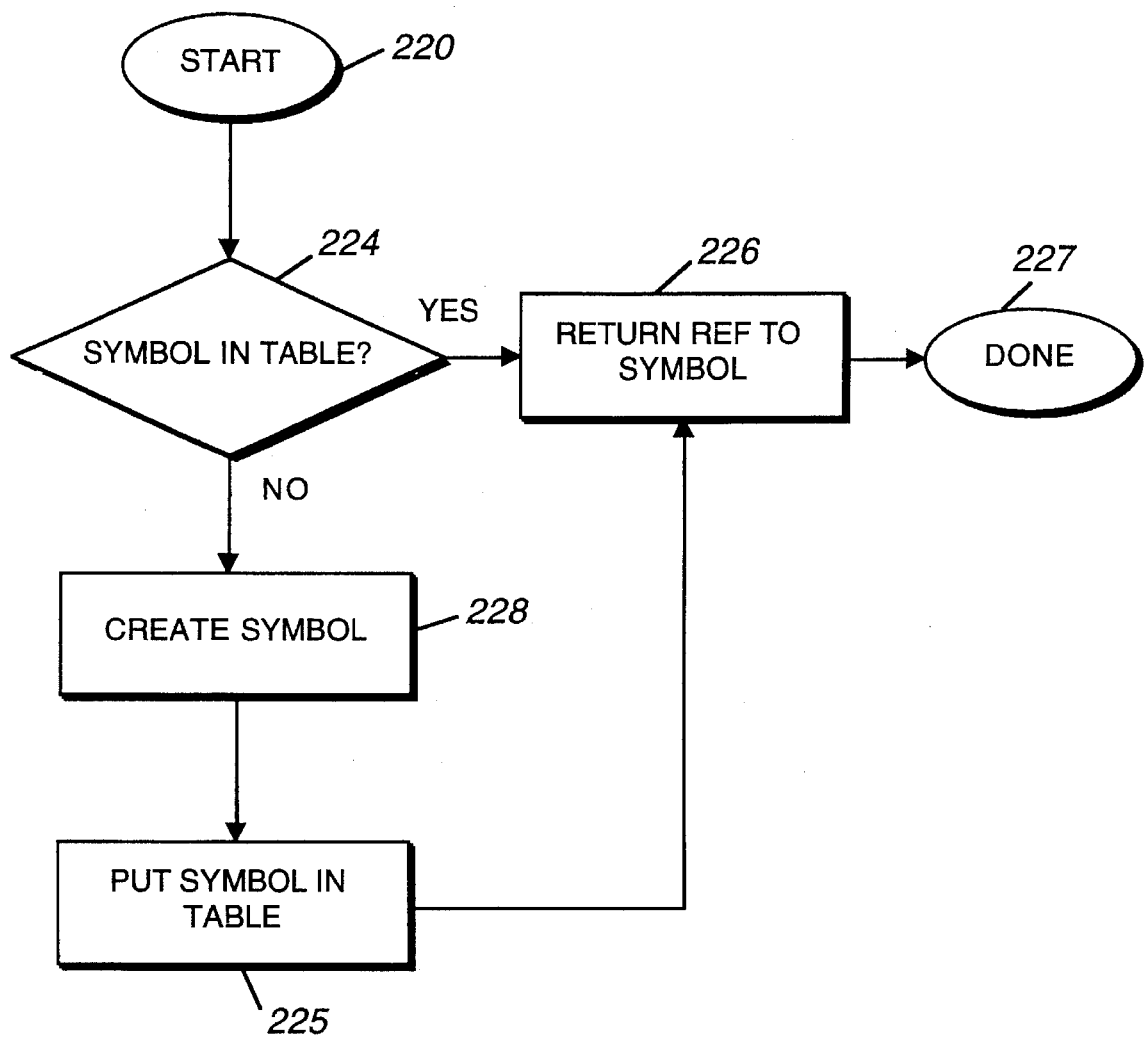
FIG. 10d shows an example process for creating a symbol ref in the absence of its prior presence in the symbol table.

FIG. 10d shows an example process for creating a symbol ref in the absence of its prior presence in the symbol table 190. The process begins at 220 and a query is made at step 224 as to whether the particular symbol is present in the symbol table 190. If the response is yes, then the ref is returned to the symbol, as suggested at step 226, and the process is completed at step 227. If, however, the symbol of interest is not found in symbol table 190, then the symbol is created at step 228, and then the symbol is put in the symbol table 190 at step 229. Next, the ref is returned to the symbol at step 226, and finally the process is completed, as indicated at step 227.

Figure 11A:
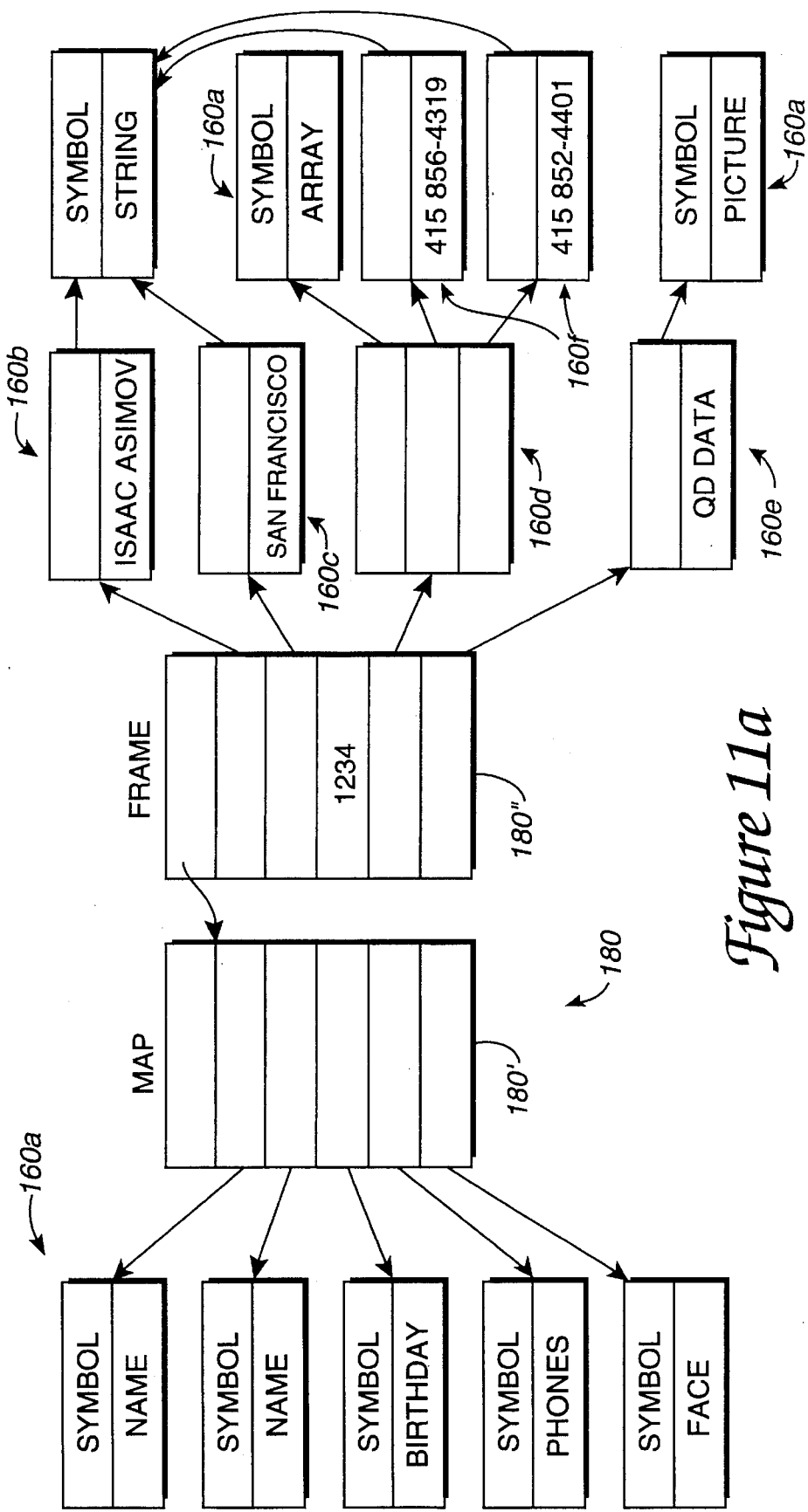
FIG. 11a illustrates an implementation example of a frame data structure according to the unified data structure of the invention, and specifically setting forth pointer relationships and chains of objects associated with the selected frame.

FIG. 11a illustrates an implementation example of a frame data structure 180 according to the unified data structure of the invention, and specifically setting forth pointer relationships and chains of objects associated with the selected frame 180. It is noted on FIG. 11a that the tags 180' of frame 180 are considered part of a map. The first ref of the ref column 180" points to the tag column 180'. The respective tags point to respective symbol objects, such as respectively the NAME symbol object, the BIRTHDAY symbol object, the PHONES symbol object, and the FACE symbol object, for example. Similarly, the slots in the ref portion 180" of frame 180, except in the case of an immediate, e.g., a number corresponding to a particular date, in this case a birthday, do point to particular objects. For example, one slot ref of frame 180 points to the ISAAC ASIMOV object 160b. Another slot ref points to object 160c. A third slot ref points to an array 160d, which in turn points to a symbol ARRAY object 160a, and first and second string objects, 160f, the latter being characterized by the SYMBOL object STRING.

Figure 11B:
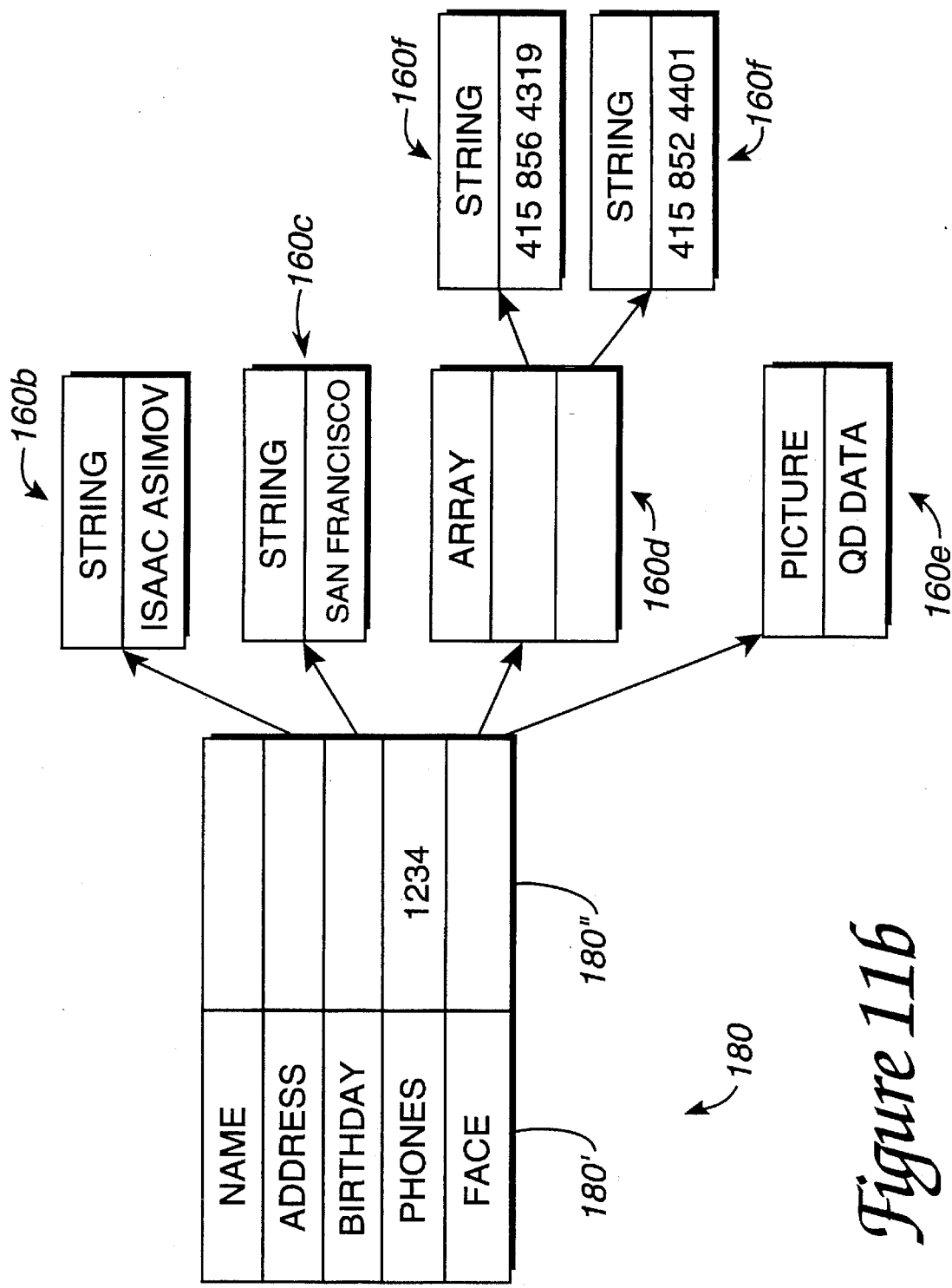

FIG. 11b illustrates details of a semantic version of the implementation of the data structures set forth in FIG. 11a. In this case, the symbol objects show up as tags in tag column 180'. Further, the symbol types are expressed in the pointer slots of the binary objects shown. Accordingly, the tags slots in the tag column 180' in frame 180 are filled with the respective names, NAME, ADDRESS, BIRTHDAY, PHONES, and FACE. Pointer arrows are shown from the ref column 180" of frame 180, except in the case of a slot being filled with an immediate, to a corresponding binary, array, or frame object being pointed to. In FIG. 11b, the arrows are respectively to first and second string binary objects, 160b and 160c, to an array object 160d in turn pointing to first and second string binary objects 160f, and finally to a picture binary object 160e having QUICKDRAW data in its immediate slot.

Figure 12:
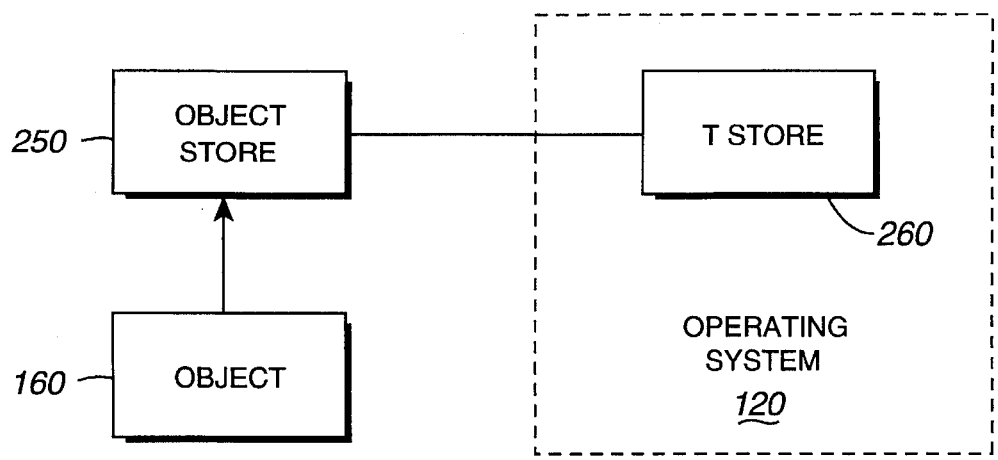
FIG. 12 shows in block diagram form the relationship between the Object store and TSTORE memory associated with the operating system.

FIG. 12 shows in block diagram form the relationship between the object store 250 and TSTORE memory associated with the operating system. In particular, object store 250 is effective for storing in compressed or non-compressed form, selected objects 160 at TSTORE which can reside at a variety of locations in the operating system 120 or under control of the operating system 120 as ROM or RAM memory, as disc memory, or as memory in a PCMCIA card (not shown).

Figure 13:
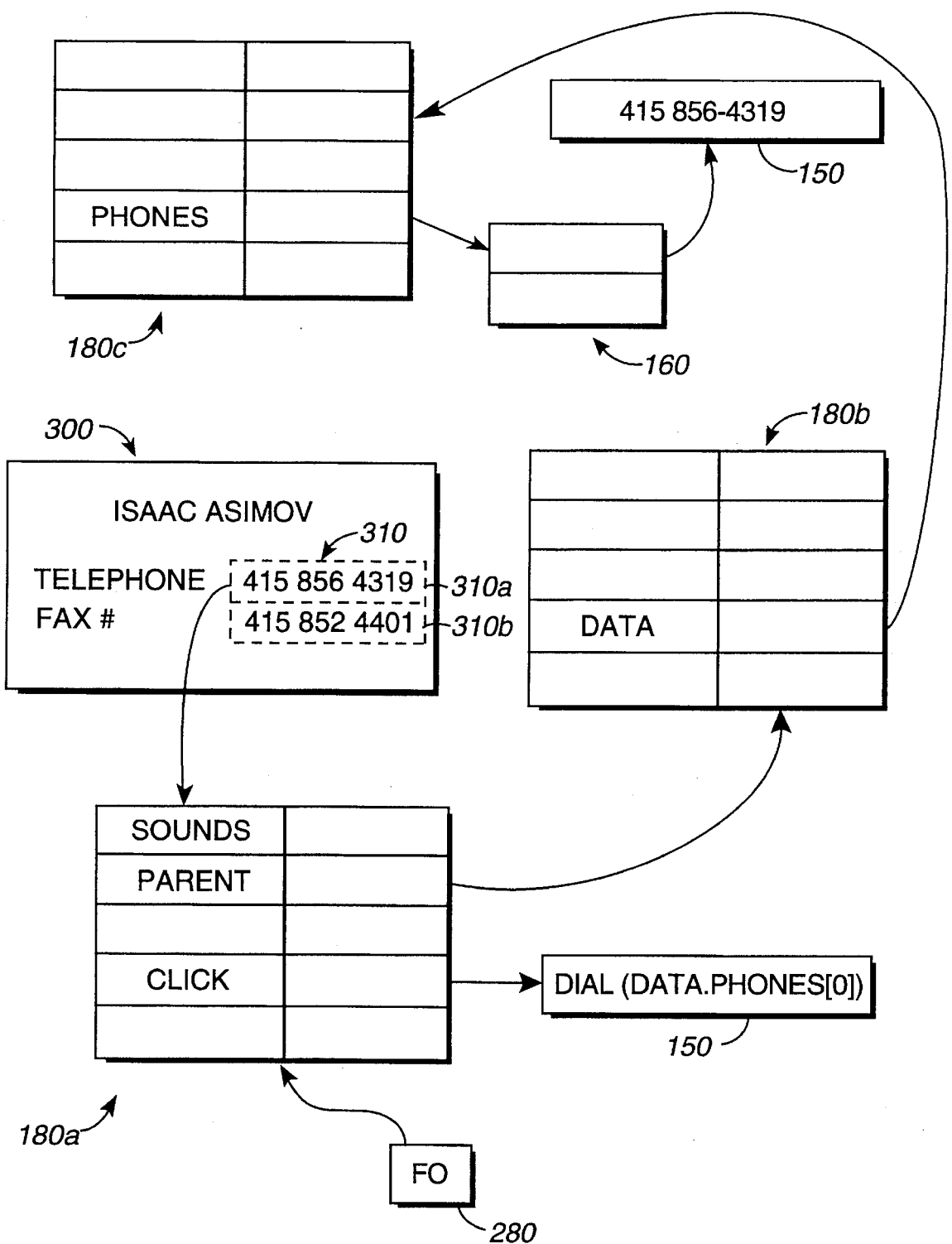
FIG. 13 illustrates the process of an example of how the scripting system and the view system interact in frame data structures to accomplish a particularized task, in this case, the dialing of a telephone number by tapping a viewer screen subwindow with a pen instrument.

FIG. 13 illustrates the process of an example of how the scripting system 103 and the view system 101 interact in frame data structures to accomplish a particularized task, in this case, the dialing of a telephone number by tapping a viewer screen subwindow with a pen 38. According to this example, a window 300 is displayed on the face of the computer screen 52. The name of the telephone callee ISAAC ASIMOV is prominently displayed or has otherwise been entered or designated as callee. Window 300 additionally shows a subwindow region 310 within window 300 for showing first and second telephone numbers in connection with ISAAC ASIMOV. These subwindow regions are respectively designated 310a and 310b.

The tapping or clicking of pen 38 on the surface of display 52 (see FIG. 2) invokes view frame 180a under control of the view system 101 (see FIG. 3). In particular, the invocation of the view frame 180a is accomplished by the view system 101 noticing the clicking of pen 38. This prompts the view system 101 to send a "click" message to view frame 180a. The CLICK slot in the view frame 180a has a pointer in its ref slot which directs toward a function in a binary object, referred to as the function object 150. The particular function object 150 involved is the function DIAL ( DATA. PHONES[O]). This function object (FO) is copied and provided with context in that its pointer refers to the view frame 180a, because the scripting system will give context to the function object in terms of the frame to which the viewing system sent the particular message. In this case, the viewing system had invoked the view frame, because of predetermined instructions to that effect. The copying is done under control of the scripting system 103 as part of its finding the click method and running it with context.

Because the script system had referred to the DATA variable, it now searches the view frame, and upon not finding it searches the parent frame 180b of the view frame, where perchance the DATA variable is found. The DATA variable is found in frame 180b. Either the pointer associated with the DATA variable ref or the PARENT pointer connects the script operation with a next frame 180c which contains the PHONES variable. This variable in turn points to an array 160 having two slots. As the PHONES variable indicates that the first value of the array is desired, i.e., PHONES[O], it returns the first telephone number in the array. This permits the DIAL function to be performed by the scripting system 103 to enable and perform dialing of a telephone number by holding the apertures 70 as for a speaker close to the acoustical receiver of a common telephone, or through a modem (not shown).

In short, the physical action of pen 38 on screen display 52 is accordingly effective to produce another physical result, i.e., the effecting of a telephone call on physical equipment of the central telephone network. This is accomplished by the cooperation of the scripting system and the viewing system operating on predetermined commonly available objects, including frames, arrays, and binary objects, without the need for complex interfacing between objects produced and managed by the object system 135, stored by the object store 105.

As the variable DATA is not to be found in the particular frame 180a to which the message was originally sent, the scripting system searches for the variable in a next parent frame 180b to which the instant frame points. The DATA slot in parent frame 180b has a corresponding ref which points to yet another frame 180c which contains a PHONES slot. Thus, according to step 412 in FIG. 14, the scripting system obtains, or "gets," the "PHONES" slot of the frame 180c referenced by the pointer in the DATA slot of the earlier frame 180b. The ref corresponding to the PHONES slot in turn points to an array 160 containing a plurality of phone numbers. As the zeroth element of the array is of interest, according to step 416 of FIG. 14, and the pointer in the array points to a binary object containing the telephone number of interest, this value will be returned to permit execution of function object 280. Then, the scripting system 103 calls the DIAL function 150.

Figure 14:
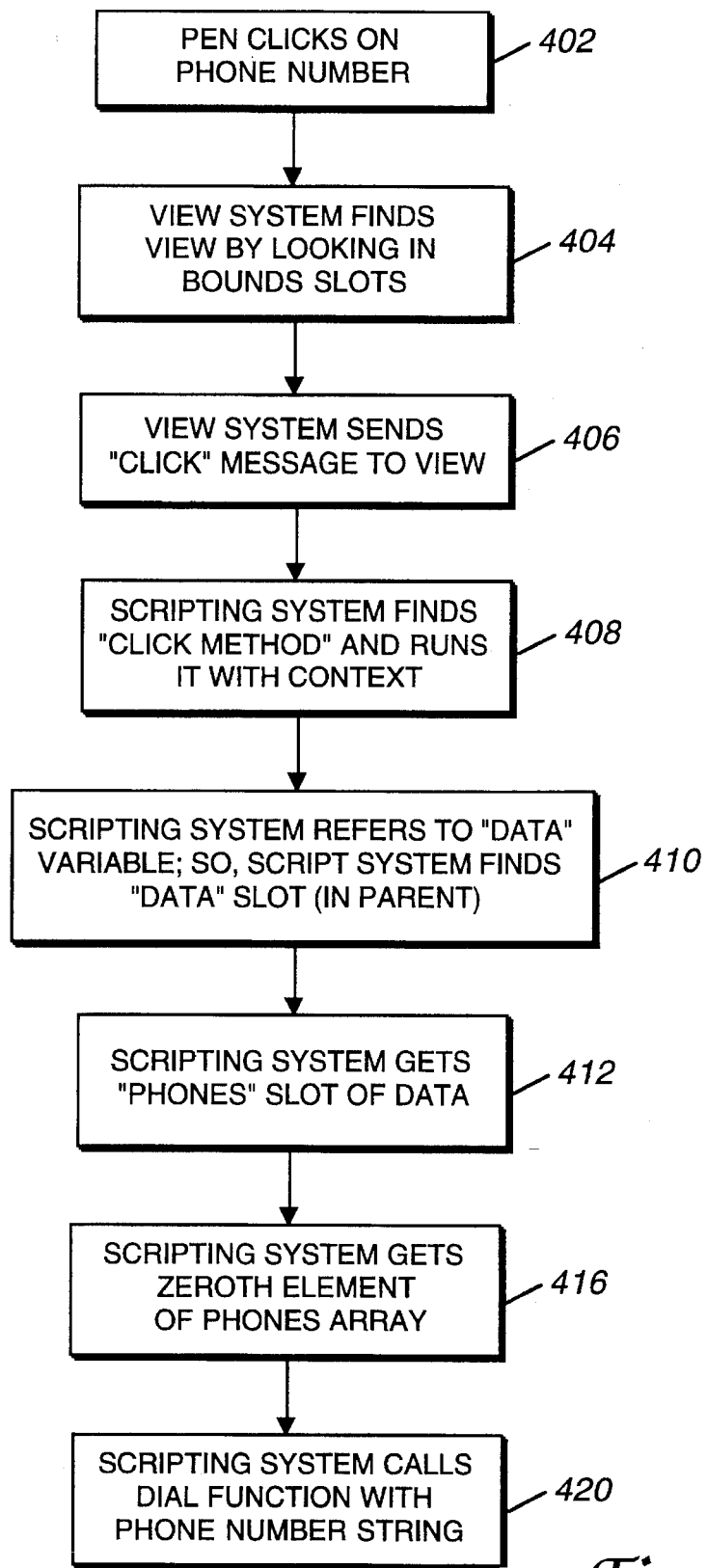
FIG. 14 is a flow diagram of a process for performing a combined script and view operation in connection with elements of the unified data structure.

FIG. 14 is a flow diagram of a process for performing a combined script and view operation in connection with elements of the unified data structure. FIG. 14 accordingly provides a useful summary of the interaction illustrated graphically in FIG. 13 with reference to the example of initiating a telephone call by clicking on the telephone number subwindow shown on the computer screen. By way of a summary and review, the process begins with the pen clicking on a selected phone number displayed in a screen window, as indicated at 402. Next, the view system finds the view frame 180a by noting the bounds defined in frame 180a at the variable BOUNDS in connection with the numbers in the bounds slots of the frame, as suggested at 404. Further, the view system sends a "click" message to the view frame 180a.

Receipt of the click message by frame 180a initiates operation by the scripting system which initiates the search for the click slot, as noted at 408. The scripting system accordingly implements the click method, running it with context, as suggested above with reference to FIG. 13. Similarly described in reference to FIG. 13 are the scripting system 103 which according to step 410 refers to a "data" variable. The scripting system 103 accordingly searches for the variable in its present frame 180a, as shown in FIG. 13. As the variable DATA is not to be found in the particular frame 180a to which the message was originally sent, the scripting system searches for the variable in a next parent frame 180b to which the instant frame points. The DATA slot in parent frame 180b has a corresponding ref which points to yet another frame 180c which contains a PHONES slot.

Thus, according to step 412 in FIG. 14, the scripting system obtains, or "gets," the "PHONES" slot of the frame 180c referenced by the pointer in the DATA slot of the earlier frame 180b. The ref corresponding to the PHONES slot in turn points to an array 160 containing a plurality of phone numbers. As the zeroth element of the array is of interest, according to step 416 of FIG. 14, and the pointer in the array points to a binary object containing the telephone number of interest, this value will be returned to permit execution of function object 280. Then, the scripting system 103 calls the DIAL function 150. This is a function object (FO) which is copied with its pointer providing context by referring to the frame 180a to which the initial call message was directed.

While this invention has been described in terms of several preferred embodiments, there are alterations, permutations, and equivalents which fall within the scope of this invention. It should also be noted that there are may alternative ways of implementing the processes of the present invention. For example, much of the programming can be simplified by using the high-level utilities and data structures mentioned in the preceding specification. In particular, the described frame database system is preferred for simplifying the programming tasks required by the computer implemented processes of the present invention, but there are many other database and graphics systems which can be used to accomplish the same task.

It is therefore intended that the following appended claims be interpreted as including all such alterations, permutations, and equivalents as fall within the true spirit and scope of the present invention.

What is claimed is:

1. A computer-implemented method for accomplishing unified data structure operations in connection with a computer including a unified data structure, a computer interface system, and a computer execution system, said method including the steps of:

(a) activating a selected screen on a computer display by effecting a screen event with a predetermined context, said selected screen being implemented by said computer interface system wherein a plurality of predetermined contexts are available with said computer display, and each one of said plurality of predetermined contexts is associated with a different one of a plurality of screen events, (b) sending a message with respect to the predetermined context of the indicated screen event to a first unified data structure element of said unified data structure, said first unified data structure element being associated with said predetermined context, and said unified data structure being common to, and able to be shared by, the computer interface system and the computer execution system, (c) responding to the message according to the predetermined context of the associated screen event, including execution by the computer execution system utilizing said unified data structure of at least a single function object associated with the predetermined context of the message, wherein different function objects are associated with different ones of said plurality of predetermined contexts, and (d) referring to at least a second unified data structure element of said unified data structure pointed to by the first unified data structure element according to the predetermined context of the message, the referring under control of the computer execution system.

2. The method of claim 1, wherein execution of said at least a single function is effective for external communication of information elements.

3. The method of claim 1, wherein the message is sent by the computer interface system and execution of the message is accomplished by a scripting system, and both the interface and execution systems employ common kinds of structural elements of the unified data structure.

4. The method of claim 3, wherein the unified data structure common to both the operations of the computer interface system and the scripting system is frame-based.

5. The method of claim 3, wherein the structural elements of said unified data structure are object-oriented.

6. The method of claim 3, wherein the structural elements of said unified data structure are under control of an object system.

7. The method of claim 6, wherein the object system includes a memory manager.

8. The method of claim 6, wherein the object system includes a data model manager, and wherein said computer includes an object store which interacts with said object system for providing storage of the structural elements of said unified data structure.

9. The method of claim 1, wherein the computer interface system is a view system.

10. The method of claim 9, wherein the view system is effective for responding to visual events occurring on the screen of a computer display.

11. The method of claim 1, wherein the computer interface system is a communications system.

12. The method of claim 1, wherein the computer interface system is effective for receiving information from external sources.

13. The method of claim 1, wherein the computer interface system is effective for transmitting information.

14. The method of claim 1, wherein the computer interface system is effective for sending and receiving information.

15. The method of claim 1, wherein the computer interface system of claim 1, receives physical input indications in the nature of pressure applied to a computer screen by a pen.

16. A computer system employing a unified data structure, and a computer execution means, said computer system comprising:

(a) computation means for performing information handling functions, (b) an object system for managing the unified data structure in a memory means, said object system being coupled to said computation means, (c) computer interface means coupled to said object system for external communication of information, said unified data structure being common to, and able to be shared by said computer interface means and said computer execution means, (d) means for accomplishing unified data structure operations under the control of said object system with the computer interface means, (e) means for activating a selected screen on a computer display, said means for activating being effective for accomplishing a screen event with a predetermined context, wherein a plurality of predetermined contexts are available with said computer display, and each one of said plurality of predetermined contexts is associated with a different one of a plurality of screen events, (f) means for sending a message with respect to the predetermined context of the indicated screen event to a first unified data structure element which is dedicated to the computer interface means and which points to a second unified data structure element, said first unified data structure element being associated with said predetermined context, (g) means for responding to the message according to the predetermined context of the associated screen event, said means for responding being effective for execution by the computer execution means of at least a single function object associated with the predetermined context of the message, wherein different function objects are associated with different ones of said plurality of predetermined contexts, and (h) means for referring to at least a second unified data structure element pointed to by the first unified data structure element according to the predetermined context of the message, the referring under control of the computer execution system.

17. The computer system of claim 16, wherein said computer interface means is effective for sending the message, said means for responding executes the message, and said computer interface means and said means for responding employ common kinds of structural elements of a unified data structure.

18. The computer system of claim 17, wherein structural elements common to both the computer interface means and the means for responding are frame-based.

19. The computer system of claim 17, wherein the structural elements of said unified data structure are object-oriented.

20. The computer system of claim 17, wherein the structural elements are under control of an object system.

21. The computer system of claim 16, wherein the computer interface means is a view system.

22. The computer system of claim 21, wherein the view system is effective for responding to visual events occurring on the screen of a computer display.

23. The computer system of claim 16, wherein the computer interface means is a communications system.

24. The computer system of claim 16, wherein the computer interface means is effective for receiving information from external sources.

25. The computer system of claim 16, wherein the computer interface means is effective for transmitting information.

26. The computer system of claim 16, wherein the computer interface means is effective for sending and receiving information.

27. The computer system of claim 16, wherein the computer interface means receives physical input indications in the nature of pressure applied to a computer screen by a pen.

* * * * *

UNITED STATES PATENT AND TRADEMARK OFFICE
CERTIFICATE OF CORRECTION

PATENT NO. : 5,588,141
DATED : December 24, 1996
INVENTOR(S) : Smith, et al.

It is certified that error appears in the above-indentified patent and that said Letters Patent is hereby corrected as shown below:

Column 3, line 2, change "System" to --system--
Column 3, line 48, change "Object" to --object--
Column 4, line 29, change "FR" to --I/R--
Column 8, line 46, change "150"" to --150'--
Column 9, line 55, change "flames" to --frames--
Column 9, line 57, change "180a" to --180a'--

Signed and Sealed this

Eighth Day of April, 1997

*Attest:*

BRUCE LEHMAN

*Attesting Officer*   Commissioner of Patents and Trademarks